Figure 1:
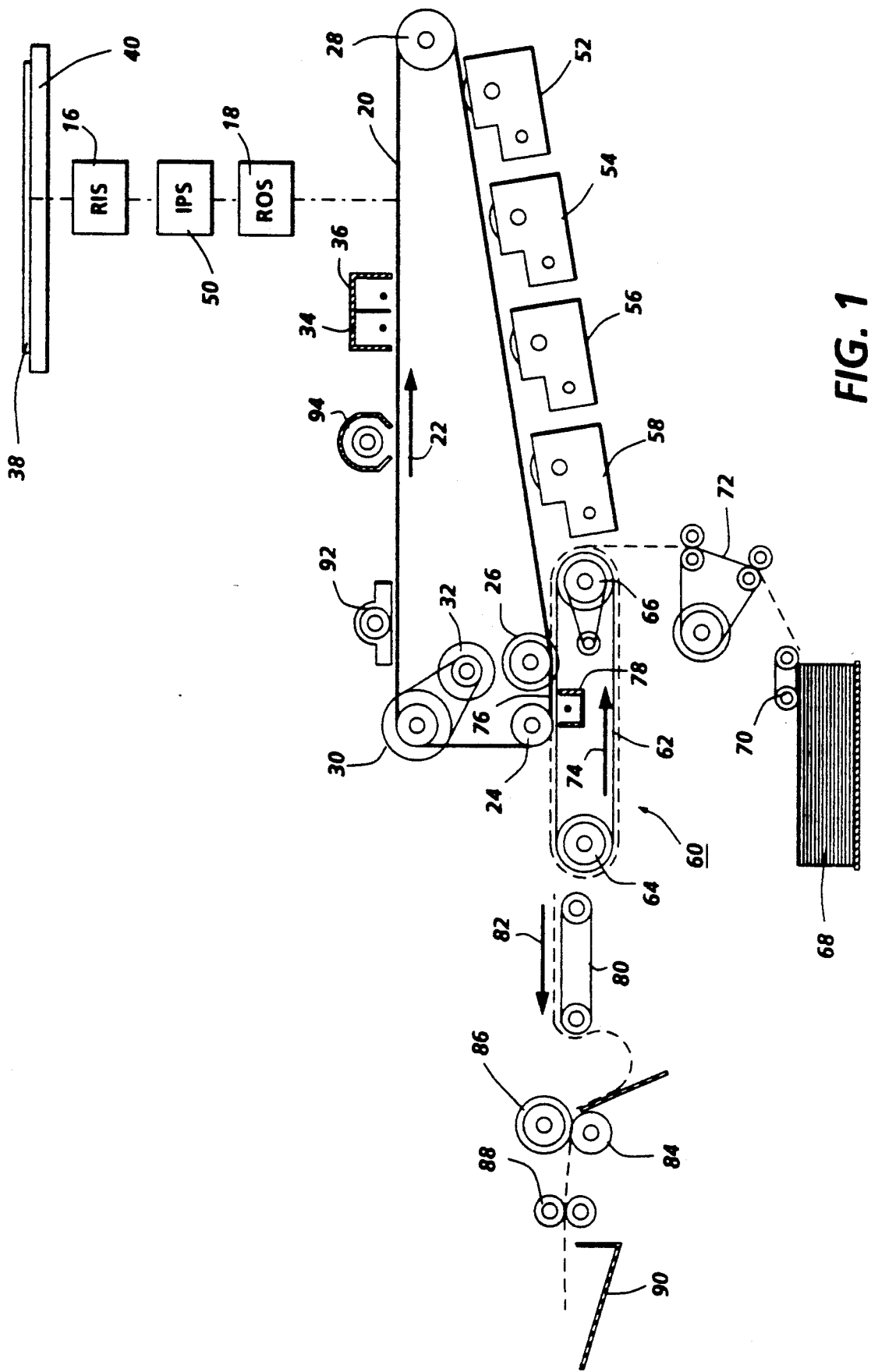

United States Patent [19]

Birnbaum

[11] Patent Number: 5,161,010

[45] Date of Patent: Nov. 3, 1992

[54] COLOR IMAGE PROCESSING APPARATUS FOR SUBSTITUTING A BLACK PIGMENT FOR IMPROVED BLACK COPYING

[75] Inventor: David Birnbaum, Pittsford, N.Y.

[73] Assignee: Xerox Corporation, Stamford, Conn.

[21] Appl. No.: 595,881

[22] Filed: Oct. 11, 1990

[51] Int. Cl.⁵ .................................................. G03F 3/08
[52] U.S. Cl. ......................................................... 358/79
[58] Field of Search .................. 358/75, 79, 80, 429, 358/455–459

[56] References Cited

U.S. PATENT DOCUMENTS

| | | | |
|---|---|---|---|
| 4,642,681 | 2/1987 | Ikeda | 358/79 |
| 4,682,216 | 7/1987 | Sasaki | 358/79 |
| 4,980,757 | 12/1990 | Nishigaki | 358/79 |
| 4,985,759 | 1/1991 | Ito | 358/79 |

*Primary Examiner*—Stephen Brinich
*Attorney, Agent, or Firm*—H. Fleischer; J. E. Beck; R. Zibelli

[57] ABSTRACT

An apparatus which determines the intensity of signals generated by a raster input scanner. The signals are inputted to a delay circuit and to a gray detector. The signals generated from the delay circuit and the gray detector are subsequently sent to a logic circuit which determines whether to output a gray signal or a non-gray signal to a raster output scanner used to expose a charged photoconductive surface to record a latent image thereon.

8 Claims, 2 Drawing Sheets

COLOR IMAGE PROCESSING APPARATUS FOR SUBSTITUTING A BLACK PIGMENT FOR IMPROVED BLACK COPYING

This invention relates generally to electrophotographic printing, and more particularly to an apparatus for processing signals from a raster input scanner.

In an electrophotographic printing machine, a photoconductive member is charged to a substantially uniform potential to sensitize the surface thereof. The charged portion of the photoconductive member is exposed. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing toner into contact therewith. This forms a powder image on the photoconductive member which is subsequently transferred to a copy sheet. The copy sheet is heated to permanently affix the marking particles thereto in image configuration.

Multi-color electrophotographic printing is substantially identical to the foregoing process of mono-color printing. However, rather than forming a single latent image on the photoconductive surface, successive latent images corresponding to different colors are recorded thereon. Each single color electrostatic latent image is developed with toner of a color complementary thereto. This process is repeated a plurality of cycles for differently colored images and their respective complementary colored toner. Each single color toner image is transferred to the copy sheet in superimposed registration with the prior toner image. This creates a multi-layered toner image on the copy sheet. Thereafter, the multi-layered toner image is permanently affixed to the copy sheet creating a color copy. The developer material may be a liquid material or a powder material.

A major problem in color copiers has been their dependence on creating a process black from three primary colors, usually consisting of cyan, magenta, and yellow. Black formed in this manner tends to often appear to be dark brown or purple. In addition, misregistration between the three color passes degrades the black representation. In the printing industry, this problem is resolved by a technique termed undercolor removal. In this technique, the black portions are removed and subsequently formed with a single color black. A problem associated with the undercolor removal process is that in order for a picture element to be replaced with black, all of the picture elements in the surrounding area must be taken into account. The instant invention sets forth a more limited black substitution process that looks at a scan line of picture elements to identify the gray areas and replace those areas with black. Thus, it is highly desirable to be capable of determining those regions of the original document which are to be reproduced in black and recording a latent image corresponding thereto which is developed with black toner rather than forming a process black in those regions. Conventional undercolor removal techniques usually require that the decision about replacing the three primary colors with black be made over a region rather than on a pixel-by-pixel basis. In addition the amount of substitution is limited to about 50% replacement. These limitations are required to maintain image quality especially with regard to image noisiness. Thus, it is highly desirable to eliminate these restrictions, which will allow for a lower cost implementation. In addition, it is desirable to allow those portions of the input document which are all black or white to be copied using only black toner, by effectively doing a 100% undercolor replacement in these regions. Various approaches have been devised for achieving the foregoing. The following disclosures appear to be relevant to various aspects of the present invention:

U.S. patent application Ser. No. 07/355,260
Applicant: Birnbaum et. al
Filed: May 22, 1989

U.S. Pat. No. 4,236,809
Patentee: Kermisch
Issued: Dec. 2, 1980

U.S. Pat. No. 4,469,433
Patentee: Kurata et al.
Issued: Sep. 4, 1984

U.S. Pat. No. 4,642,681
Patentee: Ikeda et al.
Issued: Feb. 10, 1987

U.S. Pat. No. 4,663,662
Patentee: Sekizawa et al.
Issued: May 5, 1987

U.S. Pat. No. 4,680,625
Patentee: Shoji et al.
Issued: Jul. 14, 1987

U.S. Pat. No. 4,682,216
Patentee: Sasaki et al.
Issued: Jul. 21, 1987

U.S. Pat. No. 4,690,543
Patentee: Watanabe
Issued: Sep. 1, 1987

U.S. Pat. No. 4,700,399
Patentee: Yoshida
Issued: Oct. 13, 1987

U.S. Pat. No. 4,718,040
Patentee: Ayata et al.
Issued: Jan. 5, 1988

The relevant portions of the foregoing disclosures may be briefly summarized as follows:

U.S. Pat. No. 4,236,809 discloses an electrophotographic copier in which an optical latent image is corrected for tone or color by a raster latent image. A raster input scanner, processor and raster output scanner are arranged in parallel with the optical system. The raster input scanner generates an electrical raster image signal representative of the original. The processor converts electrical correction signals as a function of the raster image signals. The raster output scanner generates a raster latent image in registration with the optical latent image in response to the electrical correction signals.

U.S. Pat. No. 4,469,433 describes a color copying machine having a color sensor coupled to logic circuitry to determine when black ink is to be used to simulate the color of the original.

U.S. Pat. No. 4,642,681 discloses a color image processing system capable of recognizing a black area by reading the output of a plurality of color detectors. Based on detection of black, color developing is inhibited in favor of a black signal.

U.S. Pat. No. 4,663,662 describes a picture processing system in which a continuous color picture is formed from dots. The processing system images the color information signals so that bi-level or dithered signals of the averaged color information signals are supplied to the picture output device.

U.S. Pat. No. 4,680,625 discloses a color corrector, which based upon detection of the light reflected from the original document, determines the local black component of the color and operationally controls development to reflect the component in the form of black developer.

U.S. Pat. No. 4,682,216 describes an image processing system which duplicates originals based on information gathered by a plurality of specialized document color detectors. The system determines the process to be used, i.e. process black or straight black, in developing the copies.

U.S. Pat. No. 4,690,543 discloses a copier having a red developer unit and a black developer unit. A charge coupled device is used to detect the red and black regions of the original document. The red portion of the latent image is erased and the latent image is developed with black toner. The next latent image has the black portion erased and the remaining portion of the latent image is developed with red toner. The black and red regions are identified during one or more pre-scan passes. Their locations are stored in memory.

U.S. Pat. No. 4,700,399 describes a color image processor which detects an edge of an image and controls black reproduction quantity to provide a detail area in a shadow area or a black character in a color image by increasing the proportion of black produced by the undercolor removal process.

U.S. Pat. No. 4,718,040 discloses a printing system using charge coupled devices for reading image data from an original. The image data is stored in a memory. A red image is reproduced with lower resolution than a black image.

In accordance with one aspect of the present invention, there is provided an apparatus for processing signals from a raster input scanner. The apparatus includes means for delaying the signals being generated by the raster input scanner for a selected time interval. Means are provided for detecting the intensity of the signals generated by the raster input scanner to determine the relationship therebetween. The detecting means is adapted to generate a first signal in response the signals from the raster input scanner being in a preselected relationship and a second signal in response to the signals from the raster input scanner being in a relationship other than the preselected relationship. Logic means, coupled to the detecting means and the delaying means, produce a gray signal responsive to the first signal from the detecting means, and a non-gray signal, responsive to the second signal from the detecting means.

Pursuant to another aspect of the present invention, there is provided an electrophotographic printing machine of the type having a raster input scanner for generating signals representative of the information in an original document being reproduced, and a raster output scanner arranged to record latent images on a photoconductive member. The improvement includes means, coupled to the raster input scanner, for delaying the signals being generated by the raster input scanner for a selected time interval. Means are provided for detecting the intensity of the signals generated by the raster input scanner to determine the relationship therebetween. The detecting means is adapted to generate a first signal, in response to the signals from the raster input scanner being in the preselected relationship, and a second signal, in response to the signals from the raster input scanner being in a relationship other than the preselected relationship. Logic means, coupled to the detecting means and the delaying means, produce a gray signal responsive to the first signal from the detecting means and a non-gray signal responsive to the second signal from the detecting means. The logic means is coupled to the raster output scanner for controlling the latent image being recorded on the photoconductive member.

Figure 2:
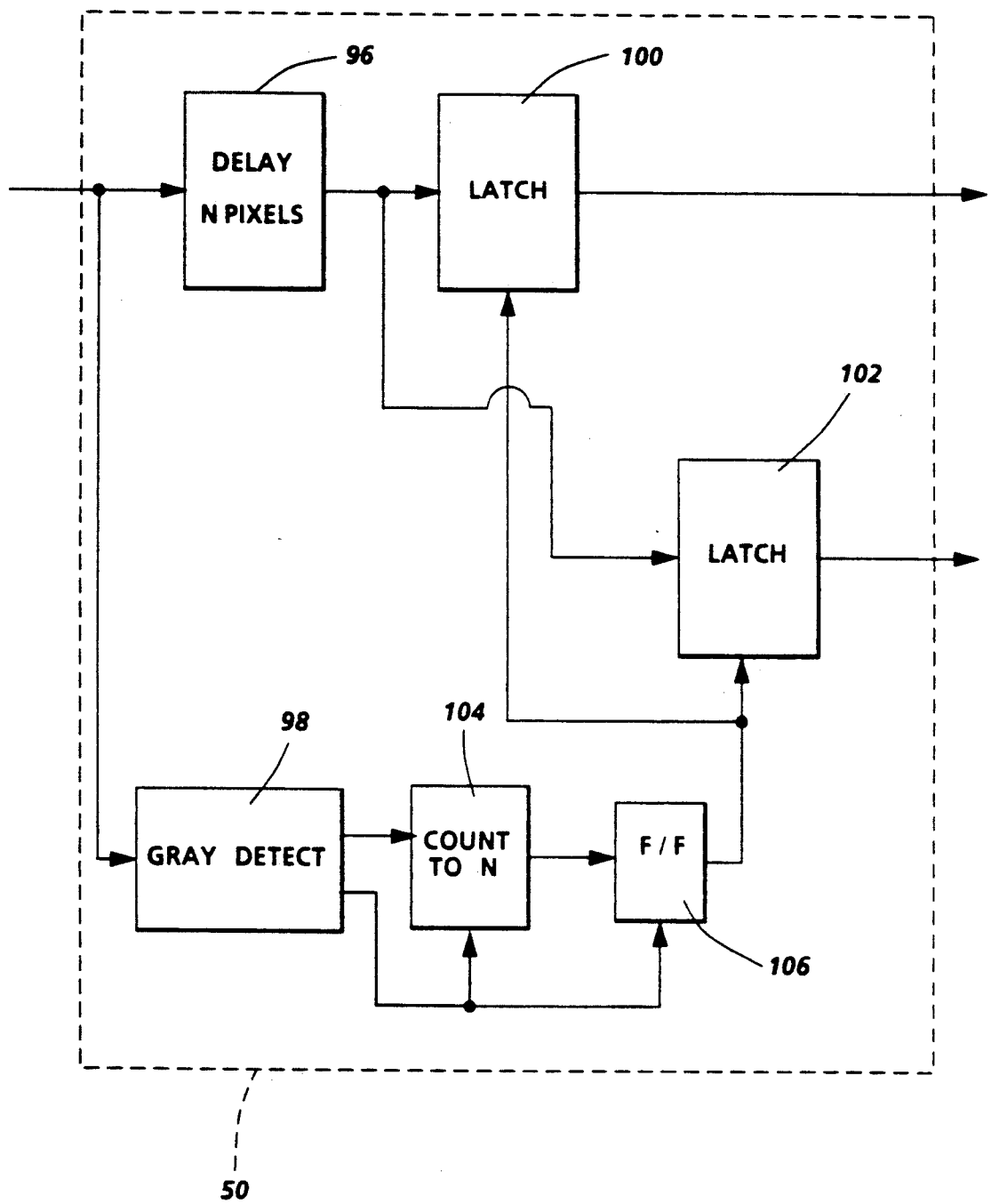

Other features of the present invention will become apparent as the following description proceeds and upon reference to the drawings, in which:

FIG. 1 is a schematic elevational view showing an illustrative electrophotographic printing machine incorporating the features of the present invention therein; and FIG. 2 is a block diagram of the image processing system used in the FIG. 1 printing machine.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the features of the present invention, reference is made to the drawings. In the drawings, like reference numerals have been used throughout to designate identical elements. FIG. 1 is a block diagram of an illustrative electrophotographic printing machine incorporating the features of the present invention therein. It will become evident from the following discussion that the present invention is equally well suited for use in a wide variety of printing systems, and is not necessarily limited in its application to the particular system shown herein.

Referring now to FIG. 1, there is shown the electrophotographic printing machine employing a photoconductive belt 20. Preferably, the photoconductive belt 20 is made from a photoconductive material coated on a grounding layer, which, in turn, is coated on an anti-curl backing layer. The photoconductive material is made from a transport layer coated on a generator layer. The transport layer transports positive charges from the generator layer. The interface layer is coated on the grounding layer. The transport layer contains small molecules of di-m-tolydiphenylbiphenyldiamine dispersed in a polycarbonate. The generation layer is made from trigonal selenium. The grounding layer is made from a titanium coated Mylar. The grounding layer is very thin and allows light to pass therethrough. Other suitable photoconductive materials, grounding layers, and anti-curl backing layers may also be employed. Belt 20 moves in the direction of arrow 22 to advance successive portions of the photoconductive surface sequentially through the various processing stations disposed about the path of movement thereof. Belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through the charging station. At the charging station, two corona generating devices, indicated generally by the reference numerals 34 and 36, charge photoconductive belt 20 to a relatively high, substantially uniform potential. Corona generating device 34 places all of the required charge on photoconductive belt 20. Corona generating device 36 acts as a leveling device, and fills in any areas missed by corona generating device 34.

Next, the charged photoconductive surface is rotated to the exposure station. At the exposure station, original document 38 is positioned on transparent platen 40. The exposure station includes a raster scanning system, which includes a raster input scanner (RIS) 16, a raster output scanner (ROS) 18 and an image processing system (IPS) 50. The RIS has document illumination lamps, optics, a scanning drive, and photosensing elements, such as a CCD array, i.e. a charge coupled device. The RIS uses a CCD array having about 1200 sites/inch in which a repeating pattern of red, green and blue filters are masked directly onto the chip. The RIS scans the original document one line at a time generating signals with each signal being representative of at least one color component in original document 38. The RIS captures the entire image from the original document 38 and converts it to a series of raster scan lines which are transmitted as electrical signals to IPS 50. The electrical signals from the RIS correspond to red, green and blue intensities at each point in the document. The IPS takes the red, green and blue signals and connects them to the proper cyan, magenta and yellow signals, transmitted to ROS 18. The conventional circuitry of IPS 50 is well known to one skilled in the art. The present invention, which is part of the IPS compares the red, blue and green intensities for each pixel in the original document. When the intensity levels for the red, green and blue pixels are in a preselected relationship to one another, e.g. about equal to one another, the pixel will be developed as gray. Those pixels wherein at least one of the intensities for the red, green and blue signals do not correspond to the preselected relationship will be indicative of a non-gray pixel. The signals from IPS 50 are transmitted to ROS 18 which includes a laser with a rotating polygon mirror. The ROS illuminates the charged portion of photoconductive belt 20 to selectively discharge areas of the photoconductive surface to record four electrostatic latent images on the photoconductive belt.

After the electrostatic latent image has been recorded on photoconductive belt 20, the belt advances the electrostatic image to the development station. The development station includes four individual developer units generally indicated by the reference numerals 52, 54 56 and 58. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer particles are continually moving so as to provide the brush consistently with fresh developer material. Development is achieved by bringing the brush of developer material into contact with the photoconductive surface. Developer units 52, 54 and 56, respectively, apply toner particles of a specific color which corresponds to the complement of the specific color of the latent image recorded on the photoconductive surface. The color of each of the toner particles is adapted to absorb light within a preselected spectral region of the electromagnetic wave spectrum. For example, the electrostatic latent image formed by discharging the green areas is made visible by having developer unit 52 apply green absorbing (magenta) toner particles thereon. Similarly, the blue discharge areas are developed by developer unit 54 with blue absorbing (yellow) toner particles, while the red discharged areas are developed by developer unit 56 with red absorbing (cyan) toner particles. Developer unit 58 contains black toner particles and is used to develop the electrostatic latent image corresponding to the gray regions of the original document. Each of the developer units is moved into and out of the operative position. In the operative position, the magnetic brush is closely adjacent the photoconductive belt. In the non-operative position, the magnetic brush is spaced from the photoconductive belt. During development of each electrostatic latent image only one developer unit is in the operative position, the remaining developer units are in the non-operative position. This insures that each electrostatic latent image is developed with toner particles of the appropriate color without co-mingling. In FIG. 1, developer unit 52 is shown in the operative position with developer units 54, 56 and 58 being in the non-operative position.

After development, the toner image is moved to the transfer station where the toner image is transferred to a sheet of support material, such as plain paper amongst others. At the transfer station, the sheet transport, indicated generally by the reference numeral 60, moves the sheet into contact with photoconductive belt 20. Sheet transport 60 has a pair of spaced belts 62 entrained about rolls 64 and 66. A qripper extends between belts 62 and moves in unison therewith. The sheet is advanced from a stack of sheets 68 disposed on a tray. A feed belt 70 advances the uppermost sheet from stack 68 onto a conveyor 72. Conveyor 72 advances the sheet to sheet transport 60. The sheet is advanced by conveyor 72 in synchronism with the movement of the gripper. In this way, the leading edge of the sheet arrives at a preselected position to be received by the open gripper. The gripper then closes securing the sheet thereto for movement therewith in a recirculating path. The leading edge of the sheet is secured releasably by the gripper. As the belts move in the direction of arrow 74, the sheet moves into contact with the photoconductive belt, in synchronism with the toner image developed thereon. At transfer zone 76, a corona generating device 78 sprays ions onto the backside of the sheet so as to charge the sheet to the proper magnitude and polarity for attracting the toner image from photoconductive belt 20 thereto. The sheet remains secured to the gripper so as to move in a recirculating path for four cycles. In this way, the cyan, yellow, magenta and black toner images are transferred to the sheet in superimposed registration with one another to form a multi-color copy of the colored original document.

After the last transfer operation, the grippers open and release the sheet. Conveyor 80 transports the sheet, in the direction of arrow 82, to the fusing station where the transferred image is permanently fused to the sheet. The fusing station includes a heated fuser roll 84 and a pressure roll 86. The sheet passes through the nip defined by fuser roll 84 and pressure roll 86. The toner image contacts fuser roll 84 so as to be affixed to the sheet. Thereafter, the sheet is advanced by forwarding roll pairs 88 to catch tray 90 for subsequent removal therefrom by the machine operator.

The last processing station in the direction of movement of belt 20, as indicated by arrow 22, is the cleaning station. A rotatably mounted fibrous brush 92 is positioned in the cleaning station and maintained in contact with photoconductive belt 20 to remove residual toner particles remaining after the transfer operation. Thereafter, lamp 94 illuminates photoconductive belt 20 to remove any residual charge remaining thereon prior to the start of the next successive cycle.

Referring now to the specific subject matter of the present invention, the present invention, which is included in the image processing system (IPS) 50, as shown in FIG. 2, includes a delay circuit 96, a gray detector 98, and a logic circuit. The logic circuit includes decision gates 100 and 102, a counter 104, and a flip flop 106. The pixels from RIS 16 are fed simultaneously to delay circuit 96, and gray detector 98. The gray detector determines if the three color signals for any pixel are in the proper balance for a gray signal. This criterion might be equality if the three signals were red (R), green (G), blue (B), or it might be different, for example if the signals are other coordinate scale signals such as L*a*b* then the gray criterion is that a* and b* are (nearly) zero.

If the gray detector determines that a pixel is gray then it increments counter 104. When counter 104 reaches its terminal count, N, it sets flip-flop 106. However, if the gray detector detects a non-gray pixel, it clears flip-flop 106 and clear counter 104. The output of flip-flop 106 is used to control the output of decision gates 100 and 102. When flip-flop 106 is activated, decision gate 100 is closed and outputs only a zero signal inhibiting a non-gray signal from being transmitted therefrom. Decision gate 102 is opened when flip flop 106 is activated. When decision gate 102 is opened, it outputs a gray signal, made from the input, which is indicative of the gray level. If the signals are R,G,B then this gray signal could be any one of these signals, if the signals are L*a*b* then the gray signal is the L* signal. When flip-flop 106 is cleared, decision gate 100 is opened and outputs a non-gray signal therefrom. Decision gate 102 is closed when flip flop 106 is cleared. When decision gate 102 is closed, it outputs only a zero signal inhibiting a gray signal from being transmitted therefrom. These signals are passed on through the rest of the image processing system and used to drive ROS 18 to record an electrostatic latent image on photoconductive belt 20.

It is clear from the foregoing description that if there are N or more pixels in a scan line that are gray, then pixel N and all succeeding gray pixels are reproduced using only black toner. This is accomplished by forcing the red, green and blue pixel signals, i.e. the non-gray signals, to zero, while the gray pixels are printed with black toner at the appropriate gray level. By proper choice of the value of N the sensitivity of the circuit to small regions can be controlled. Therefore the circuit will not be active in continuous tone regions where there may be small regions of gray, but will be effective in regions where the data is exclusively gray.

In recapitulation, the apparatus of the present invention determines the intensity of signals for every scan line generated by the raster input scanner. The scan line is inputted to a delay circuit and to a gray detector which sends its information to a logic circuit which includes a delay circuit, a counter, decision gates, and a flip flop circuit. The delay circuit enables the gray detector and the logic circuit to have sufficient time to decide whether the scan line is a gray region or a non-gray region. If the gray detector determines that the intensity of the signals are in a preselected relationship to each other, the logic circuit enables the scan line to be sent to a raster output scanner so that the gray region is recorded as an electrostatic latent image on the photoconductive belt that is developed with black toner. If the gray detector determines that the intensity of the signals are not in the preselected relationship, the logic circuit will enable the scan line to be sent to the raster output scanner so that the non-gray region is recorded as an electrostatic latent image on the photoconductive belt that is developed with cyan, magenta, and yellow toner.

It is, therefore, apparent that there has been provided in accordance with the present invention, an apparatus which determines the intensity of signals from a scan line generated by raster input scanner that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An apparatus for processing signals from a raster input scanner, including:

means for delaying the signals being generated by the raster input scanner for a selected time interval;

means for detecting the intensity of the signals generated by the raster input scanner to determine the relationship therebetween, said detecting means generating a first signal in response to the signals from the raster input scanner being in a preselected relationship and a second signal in response to the signals from the raster input scanner being in a relationship other than the preselected relationship, said detecting means generates a binary signal having a high output when the intensity of the signals from the raster input scanner is in the preselected relationship and a low output when the intensity of the signals from the raster input scanner is in the relationship other than the preselected relationship; and logic means, coupled to said detecting means and said delaying means, for producing a gray signal responsive to the first signal from said detecting means, and a non-gray signal, responsive to the second signal from said detecting means, said logic means includes means for counting the number of binary signals from said detecting means having a high output, said counting means generating a set signal in response to the count of successive high output binary signals reaching a preselected number.

2. An apparatus according to claim 1, wherein said logic means includes:

flip flop means coupled to said detecting means and said counting means, said flip flop means being activated in responsive to said counting means generating the set signal and being cleared in response to said detecting means generating the binary signal having the low output; and gate means, coupled to said flip flop means and said delaying means, for transmitting the non-gray signal therefrom in response to said flip flop means being cleared and for transmitting the gray signal therefrom in response to said flip flop means being activated.

3. An apparatus according to claim 2, wherein said gate means includes a first decision gate, said first decision gate being closed in response to said flip flop means being activated inhibiting the non-gray signal from being transmitted therefrom and being opened in response to said flip flop means being cleared enabling the non-gray signal to be transmitted therefrom.

4. An apparatus according to claim 3, wherein said gate means includes a second decision gate, said second decision gate being opened in response to said flip flop means being activated enabling the gray signal to be transmitted therefrom and being closed in response to said flip flop means being cleared inhibiting the gray signal from being transmitted therefrom.

5. An electrophotographic printing machine of the type having a raster input scanner for generating signals representative of the information in an original document being reproduced, and a raster output scanner arranged to record latent images on a photoconductive member, wherein the improvement includes:

means, coupled to the raster input scanner, for delaying the signals being generated by the raster input scanner for a selected time interval;

means for detecting the intensity of the signals generated by the raster input scanner to determine the relationship therebetween, said detecting means generating a first signal, in response to the signals from the raster input scanner being in the preselected relationship, and a second signal, in response to the signals from the raster input scanner being in a relationship other than the preselected relationship; said detecting means generates a binary signal having a high output when the intensity of the signals from the raster input scanner is in the preselected relationship and a low output when the intensity of the signals from the raster input scanner is in the relationship other than the preselected relationship; and logic means, coupled to said detecting means and said delaying means, for producing a gray signal responsive to the first signal from said detecting means and a non-gray signal responsive to the second signal from said detecting means, said logic means being coupled to the raster output scanner for controlling the latent image being recorded on the photoconductive member; said logic means includes means for counting the number of binary signals from said detecting means having a high output, said counting means generating a set signal in response to the count of successive high output binary signals reaching a preselected number.

6. A printing machine according to claim 5, wherein said logic means includes:

flip flop means, coupled to said detecting means and said counting means, said flip flop means being activated in response to said counting means generating the set signal and being cleared in response to said detecting means generating a binary signal having the low output signal; and gate means, coupled to said flip flop means and said delaying means, for transmitting the non-gray signal in response to said flip flop means being cleared and for transmitting the gray signal in response to said flip flop means being activated.

7. A printing machine according to claim 6, wherein said gate means includes a first decision gate, said first decision gate being closed in response to said flip flop means being activated inhibiting the non-gray signal from being transmitted therefrom and being opened in response to said flip flop means being cleared enabling the non-gray signal to be transmitted therefrom.

8. A printing machine according to claim 7, wherein said gate means includes a second decision gate, said second decision gate being opened in response to said flip flop means being activated enabling the gray signal to be transmitted therefrom and being closed in response to said flip flop means being cleared inhibiting the gray signal from being transmitted therefrom.

* * * * *